US006983842B2

(12) United States Patent
Krummenacher

(10) Patent No.: US 6,983,842 B2
(45) Date of Patent: Jan. 10, 2006

(54) FASTENING DEVICE FOR DATA CARRIER

(75) Inventor: Josef Krummenacher, Muri (CH)

(73) Assignee: AWM Mold Tech AG, (CH)

( * ) Notice: Subject to any disclaimer, the term of this patent is extended or adjusted under 35 U.S.C. 154(b) by 42 days.

(21) Appl. No.: 10/731,822

(22) Filed: Dec. 9, 2003

(65) Prior Publication Data

US 2004/0119295 A1     Jun. 24, 2004

(30) Foreign Application Priority Data

Dec. 11, 2002   (CH) ..................... 2113/02

(51) Int. Cl.
   *B65D 85/57*         (2006.01)
(52) U.S. Cl. .................... 206/308.1; 206/310
(58) Field of Classification Search ............. 206/308.1, 206/308.2, 310
   See application file for complete search history.

(56) References Cited

U.S. PATENT DOCUMENTS

| | | | |
|---|---|---|---|
| 5,251,750 A * | 10/1993 | Gelardi et al. ........... | 206/308.1 |
| 5,626,225 A * | 5/1997 | Joyce, Jr. ................ | 206/308.1 |
| 5,785,172 A | 7/1998 | Bolognia et al. | |
| 5,894,924 A * | 4/1999 | Koch ......................... | 206/310 |
| 6,016,909 A * | 1/2000 | Chang ........................ | 206/310 |
| 6,170,656 B1 * | 1/2001 | Cerda-Vilaplana et al. ...... | 206/308.1 |
| 2002/0157975 A1 | 10/2002 | Tsunematsu | |
| 2003/0015441 A1 * | 1/2003 | Kang et al. ................ | 206/310 |

FOREIGN PATENT DOCUMENTS

| | | |
|---|---|---|
| DE | 4107218 | 9/1992 |
| EP | 0692791 A1 | 1/1996 |
| EP | 0762425 A2 | 3/1997 |
| EP | 0817196 A1 | 1/1998 |
| FR | 2751777 A1 | 1/1998 |
| WO | WO 97/36298 | 10/1997 |
| WO | WO 01/39193 A1 | 5/2001 |
| WO | WO 02/29816 A1 | 4/2002 |

\* cited by examiner

*Primary Examiner*—Mickey Yu
*Assistant Examiner*—Jerrold Johnson
(74) *Attorney, Agent, or Firm*—The Webb Law Firm

(57) ABSTRACT

The use of soft material or thinly designed tongues is made possible for fastening devices for at least one disc shaped data carrier with a central opening in a cassette, wherein the cassette comprises a middle part on which a crown of tongues is provided, elastically insertable into the central opening of the at least one data carrier, while still preventing unwanted falling out of the data carrier, for example CDs or DVDs. This is made possible in that at least one connecting element is provided, moveably connecting at least two of the tongues, wherein the connecting element is produced in the production of the fastening device in a first position and wherein after the production for increasing the restoring force of the tongues against the data carrier the connecting element is moved into a second position.

17 Claims, 3 Drawing Sheets

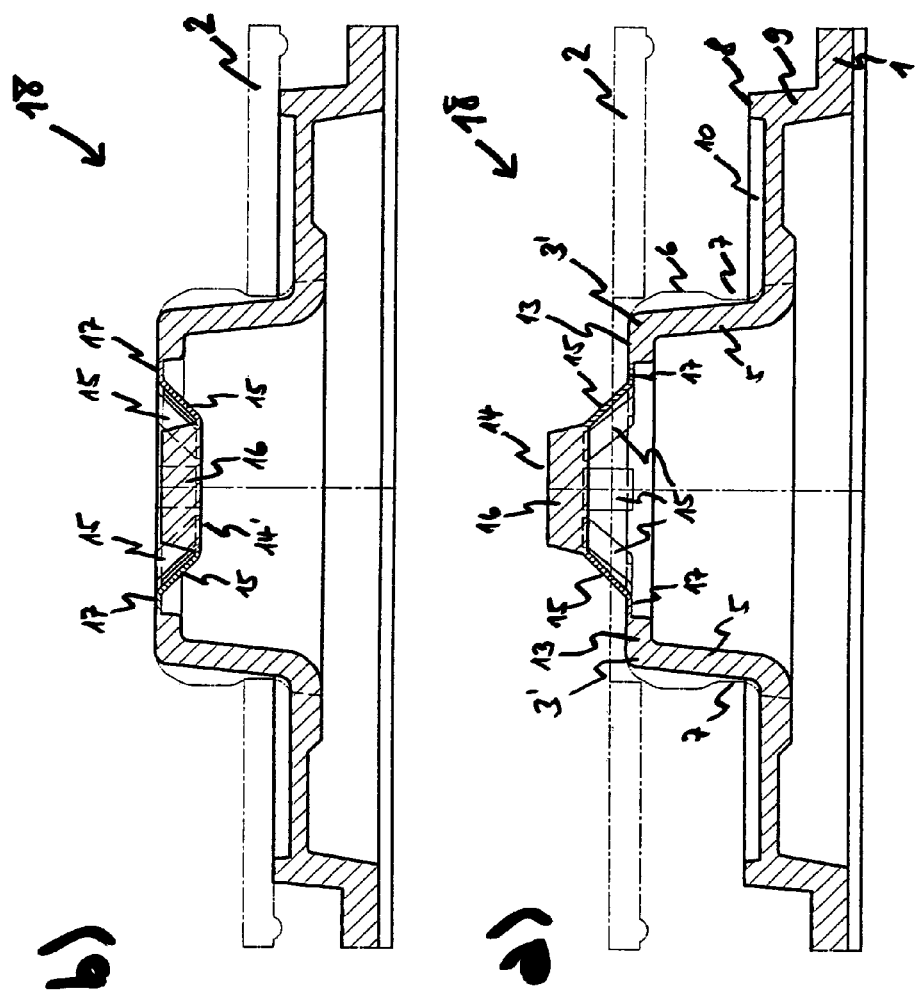

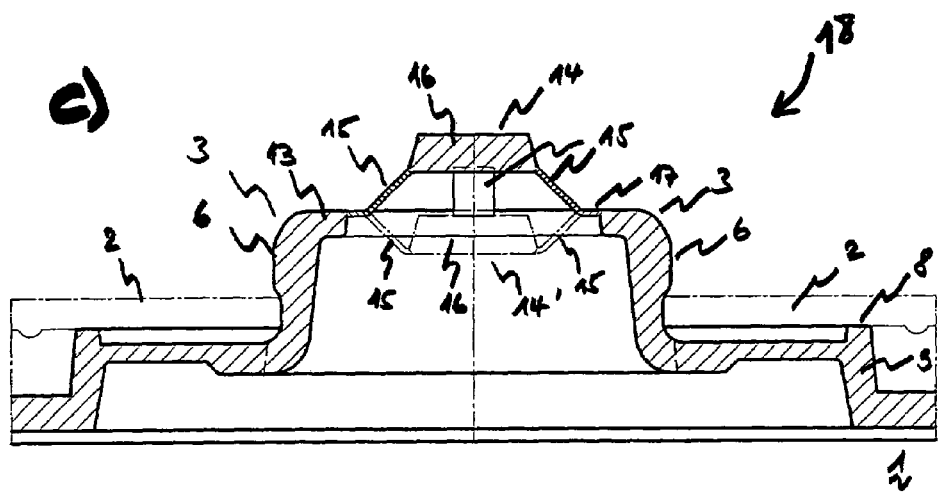

FASTENING DEVICE FOR DATA CARRIER

TECHNICAL FIELD

The present invention relates to a fastening device for at least one disc shaped data carrier with a central opening in a cassette, wherein the cassette comprises a middle part on which a crown of tongues is provided, elastically insertable into the central opening of the at least one data carrier.

BACKGROUND OF THE INVENTION

For safe storage of data carriers like CDs or DVDs commonly cassettes are used, into which the data carriers are put. The data carriers are being fastened to the housing of the cassette by means of a fastening device. The fastening device may either grip or fix the data carrier on its peripheral outer border, or, and this version is more commonly used, the fastening device comprises means to insert into the central opening of the data carrier (if need be in combination with an additional peripheral fixation). Such central fastening devices, usually comprising a crown of flexible tongues, which are elastically insertable into the central opening of the data carrier, are described in a large number of documents, such as for example in WO 01/39193, EP 0817196, EP 0762425, DE 4107218 or in U.S. Pat. No. 5,785,172.

Usually such cassettes are being produced by using thermoplastic materials, that is plastics with a flow transition above the usual temperature of use. Of particular interest in this respect are plastics which are available on the market for cheap prices, such as polyethylene (PE), particularly LDPE (Low Density Polyethylene) and HDPE (High Density Polyethylene), Polyvinylchloride (PVC), Polystyrene (PS) or Polypropylene (PP). When using such materials, usually the whole cassette is made from such a material in a forming process, it is however also possible to use combinations of different materials, wherein for example the outer part of a housing is made from one material, and the insert, i.e. the middle part, on which the fastening device is provided, is made from another material.

One of the problems in the context of such fastening devices is very often that such fastening devices have the tendency to break apart for example if a cassette is dropped down. In particular if Polystyrene is used for the fastening device, it is possible that if the cassette is dropped in a direction parallel to the plane of the CD fastened within the cassette, one or more of the tongues of the crown break out, the reason for which is that Polystyrene is stiff and rather brittle, wherein however this stiffness is desired because of the possible restoring force of the tongues. To avoid such breaking out of the tongues, the document EP 0692791 proposes to provide tongues which are undercut in the support region for the CD, wherein the tongues are unsupportedly extending comprising a radial arm and an axial arm, and wherein a continuous arched transition, or connection, respectively, is provided between the radial and the axial arm. This design allows a good fastening as well as a sufficient toughness of the tongues, because the tongues have an increased elasticity, and due to the undercut support the shearing forces at the tongues are well distributed.

Also problematic in the context of such fastening devices is the fact that if such a cassette is dropped, the data carrier very often jumps out of the fastening device and is subsequently loose in the cassette. This may, in particular if the loose data carrier is not noticed and the cassette with the loose data carrier is being moved, lead to irreversible damage of the data carrier. This problem can for example be solved in that the fastening device for the data carrier works with a larger force, which for example can be achieved by an increased stiffness, by means of additional peripheral fastening means, or by means of more pronounced retaining noses. All these measures however have the drawback that accordingly, to remove the data carrier from the cassette, an increased force has to be used, and that it is in particular more difficult to release the data carrier from the cassette, or take it out of the fastening device, respectively. This may even go so far that there is a realistic danger to damage the data carrier when removing it from the cassette.

Correspondingly, it would be desirable to have soft and thus usually less brittle material for the manufacture of such fastening devices. Unfortunately however, such soft materials can typically not be designed in a slender manner at the same time showing a sufficiently large restoring force of the tongues.

SUMMARY OF THE INVENTION

That is where the present invention provides a solution. The objective problem underlying the present invention is therefore to provide a fastening device for at least one disc shaped data carrier with a central opening in a cassette, which sufficiently fastens the data carrier in the carrier but at the same time shows a good comfortful removal of the data carrier, and which even if comparingly soft materials are used allows to have a restoring force of the tongues which is sufficiently large for fixing the data carrier. The cassette comprises a middle part on which means are provided, that are elastically insertable into the central opening of the data carrier. These means are preferentially designed in the form of a crown of tongues, which are elastically insertable into the central opening of the at least one data carrier. The disc shaped data carrier is preferentially a CD or a DVD.

The present invention solves the above problem in that at least one connecting element is provided, moveably connecting at least two of the tongues, wherein the connecting element is produced in the production of the fastening device in a first position, and wherein after the production for increasing the restoring force of the tongues against the data carrier, the connecting element is moved into a second position.

The core of the present invention therefore resides in providing a connecting element, which, is manufactured in a first, so to speak relaxed position. These manufactured tongues typically do not show a sufficient restoring force for fixing a data carrier. Subsequently however, the connecting element is shifted into a second position, such that after that the restoring force of the tongues is increased. The unit of connecting element and tongues is correspondingly moved if shifted from the first to the second position, into a so to speak tensioned or pretensioned stage, such that even if soft material (or analogously if the elements are designed very thinly) is used for the tongues, a large restoring force can be effected. It is therefore possible to, either if very thin teeth are provided or if the teeth are provided from soft material, cases in which usually an immediate manufacturing of the fastening device with sufficient restoring force is not possible, the sufficient restoring force can be made available after the actual manufacturing process by means of shifting or tilting or snapping of such connecting elements. The basic idea is therefore to manufacture a fastening device in a first state in a forming process (wherein in this first state the restoring force of the tongues is generally insufficient for a reasonable fastening of the data carrier), and thereby to provide means, which after the material has solidified, can be moved into another stable position, whereby an elastic increase of the restoring force of the tongues can be established.

This tilting or snapping can either be designed such that it is irreversible, i.e. that it can only be carried out from the first to the second position once without destruction, or it can be given such that moving it back to the first position is possible without breaking. It has nevertheless to be pointed out that it is not the principal aim so to speak by moving into the first position fix the data carrier in the fastening device and to, for removal of the data carrier, bring the fastening device back into a first position. Quite on the contrary, the aim is to bring the connecting element once into its second position, and to remove as well as insert the data carrier while leaving the connecting element in its second position. Typically therefore, the connecting element is usually hidden in its second, so to speak pretensioned position between the tongues, and for the end-user it is generally not visible that the connecting element had been manufactured in another, first position before.

A first preferred embodiment of the present invention is characterised in that opposed tongues are connected with each other by means of at leased one connecting element. If such opposed tongues are at least indirectly connected via a connecting element, the desired increase of the restoring force can be realised very easily.

Another preferred embodiment is characterised in that the tongues comprise an axial arm extending through the central opening of the data carrier, wherein the at least one connecting element is preferably indirectly attached to these axial arms and connecting these axial arms substantially on the ends pointing towards the direction of removal of the data carrier. Preferably the connecting element is connected to these axial arms indirectly by means of inwardly pointing radial arms provided on the ends of the axial arms pointing to the direction of removal of the data carrier. Snapping of the connecting element into its second position can be provided particularly easily if in its first position the connecting element at least partially extends above the ends of these axial arms pushing down the connecting element in the direction of insertion of the data carrier can be shifted into its second position, preferably in a snapping process. Preferentially, the connecting element does not extend above the ends of these axial arms pointing towards the direction of removal of the data carrier in its second position and/or of the radial arms respectively. Typically therefore for the end-user looking at the fastening device it is not easily recognizable that the connecting element can be shifted into a first postion at all.

Furthermore, the connecting element can be designed such that it comprises in particular elastic strips, which on theirs one end are connected with the axial or radial arms of the tongues respectively, and that the connecting element furthermore comprises a knob or a ring which is substantially located on the axis of symmetry of the fastening device, to which knob or ring the strips are connected with their second end. The knob or ring can be a cylindrical element, particularly a circular cylindrical element.

According to another preferred embodiment the tongues and the at least one connecting element are designed as one piece. In other words the whole fastening device including tongues and connecting element(s) is produced in one single die in a forming process like for example an injection molding process, as one single piece. For example a one component injection molding process or a two component injection molding process can be used.

As already mentioned further above, the inventive idea proves to be particularly useful, if either the tongues are designed quite thinly, or if a soft (and correspondingly usually less brittle) material is used for the manufacture. Typically, a polymeric material is used for the production. As a soft material, for example a polymer with a modulus of elasticity E in the range of 1300 to 3200 MPa can be used, in particular preferentially of less than 2000 MPa. Preferentially, a thermoplastic material like polypropylene can be used.

According to another preferred embodiment of the present invention, the crown comprises 4, 6 or 8 or 10 tongues (an uneven number is however also possible), wherein if need be alternatingly tongues with noses for fixing the data carrier and tongues without noses are provided, and either all tongues or only tongues with noses are joined together via the connection element. Thereby the connecting element preferentially comprises a central, uniform part, as well as elastic strips branching off from this central, uniform part by at least indirectly connecting the central uniform part with the tongues.

Another preferred embodiment of the present fastening device is characterized in that the middle part comprises an inner substantially disc shaped part, on the inner edge of which the tongues are attached spaced from each other leaving slots between the tongues. Preferentially, furthermore the inner part comprises means allowing an increased elastic mobility of the crown of tongues with respect to the cassette, wherein these means are preferentially given in the form of a preferably circumferential region with reduced thickness of the material, and/or in the form of a preferentially circumferential rippled region, and/or in the form of holes in the inner part.

Principally, in the present matter, the fastening device may either be a fastening device for a single data carrier but also a fastening device for several data carriers. Accordingly, the tongues can for example be designed such as to fasten two stacked data carriers provided on top of each other, wherein preferentially alternatingly only every second tongue is provided with a nose for axial fastening of the data carrier, while on the other tongues a rib is provided for keeping a controlled distance between the stacked data carriers.

In particular if polypropylene is used as the production material of the fastening device, the effect according to the invention is particularly pronounced, if the at least one connecting element comprises strips in the form of flexible, flat planar lamella, with a width in the range of 0.8 to 3 mm, preferentially in the range of 1 to 2 mm and with thickness of 0.1 to 0.4 mm, preferentially with a thickness of 0.2 to 0.3 mm.

Further preferred embodiments of the fastening device according to the present invention are described in the dependent claims.

Furthermore the present invention relates to a method for the manufacturing of a fastening device as it is described above. The method is particularly characterised in that in a first production step in a forming process the connecting element is produced in its first position, and in that subsequently, at the latest after insertion of the first data carrier, the connection element is brought into its second position for increasing the restoring force against the data carrier.

Further preferred embodiments of the method according to the invention are outlined in the dependent claims.

BRIEF DESCRIPTION OF THE DRAWINGS

In the following the invention shall be outlined in more detail by means of particular examples in connections with the drawings. The drawings are showing the following:

FIG. 2a) a cut along the line B—B in FIG. 1b), wherein the connecting element is shown in its first position; b) a cut along the line B—B in FIG. 1b), wherein the connecting element is shown in its second position; c) a cut along the line A—A in FIG. 1b), wherein the connecting element is shown in its first as well as in its second position, and wherein only strips are provided to the tongues with noses.

DETAILED DESCRIPTION OF THE PREFERRED EMBODIMENT

Figure 1:
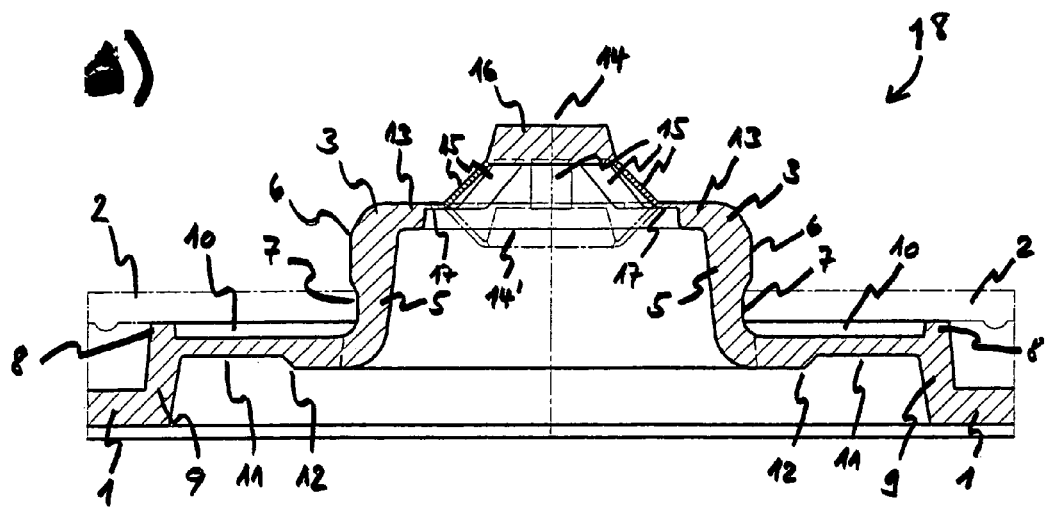
FIG. 1a) a cut along the line A—A in FIG. 1b), wherein the connecting element is shown in its first as well as in its second position; b) a top view onto the fastening device.
Figure 1:
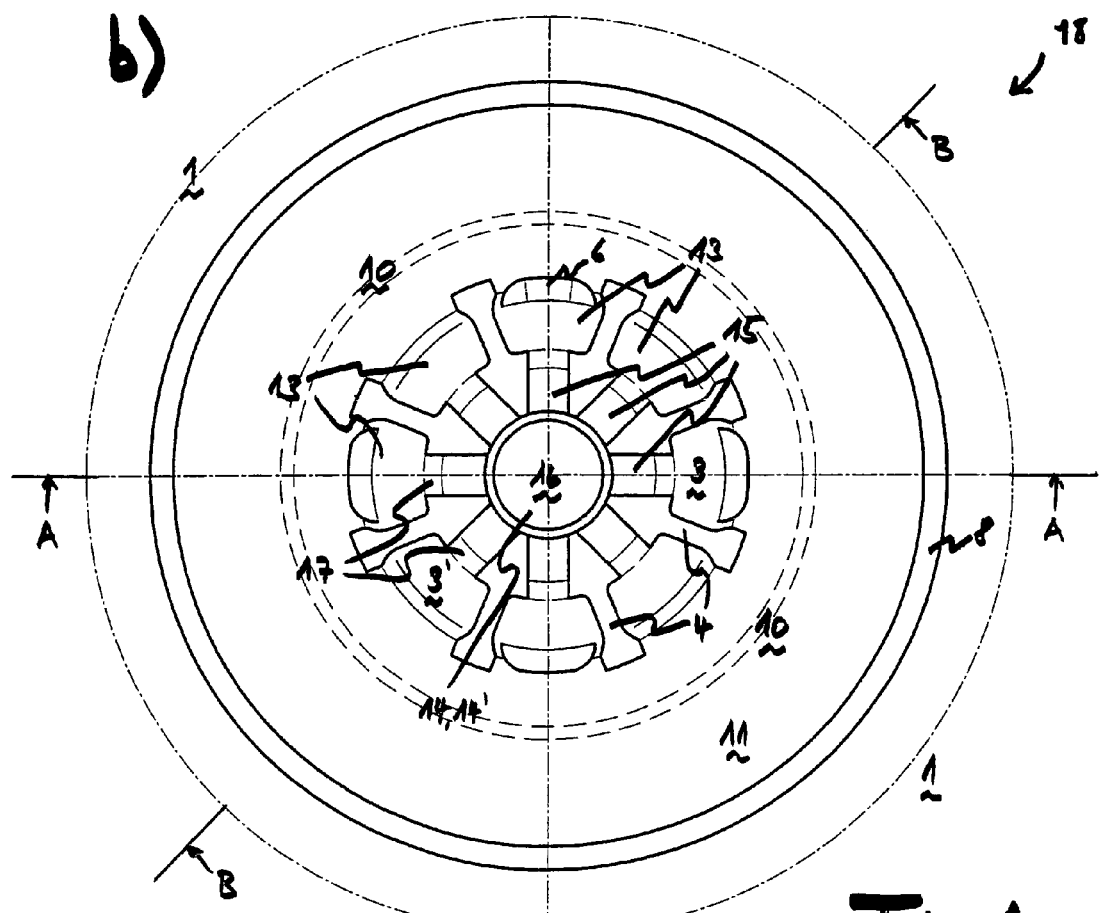

A first embodiment of the present invention is shown in FIGS. 1 and 2. FIG. 1b) shows a top view onto a fastening device. All elements shown are made of polypropylene (PP). The fastening device is fixed in a cassette 18 or forms integral part of such a cassette 18. Of the cassette 18 only the middle part 1 is shown, which generally is provided as a flat surface made of plastic, and which comes to lie below the CD 2. Generally such a fastening device is designed to take up data carriers like CDs or DVDs with a central opening, as an example in the following only CDs shall however be mentioned without excluding other data carriers with central openings. Furthermore, it has to be pointed out that such a fastening device can be combined or supplemented with additional clamping devices, which fix the CD 2 on its peripheral border. The surface defining the middle 1 has a thickness of 1.4 mm. The fastening device additionally comprises a supporting ring 8, onto which the CD, if it is fixed in the fastening device, is resting, or onto which, in case of several CDs, the CD on the bottom is resting. The supporting ring 8 has a diameter of 30 mm, such that the CD is not touching the supporting ring with its data carrying area. The supporting ring 8 has a width of 1 mm. Immediately adjacent to the supporting ring 8 on its radial inner side, there is provided an inner disc shaped area 10, which in its center carries a crown of 8 tongues 3,3'. Alternatingly, these tongues are provided with noses 6, by means of which the CD is retained. Between the tongues 3,3' there is provided slots 4, which however only extend to the foot portion of the tongues, and not to the inner part 10.

The inner part 10 is provided with a region of reduced thickness 11, which is disc shaped, and which is provided adjacent to the supporting ring 8 on its immediate inner radial side. The region of reduced thickness 11 has a thickness of 0.7 mm and a width b of approx. 4 mm, and the region of reduced thickness 11 is limited towards the inner side by means of a radial inner boundary 12 (indicated in FIG. 1 in a dashed line).

The tongues 3,3' are provided with a radial arm 13, which, among other things, can be used for facilitating the removal of the CD. To this end, one presses with the thumb onto the arms 13, such that the tongues 3,3' slightly tilt towards the inner side, and thus also the noses recede and the CD can easily be removed.

FIG. 1a) shows a cut along the line A—A through a fastening device according to FIG. 1b). The cut therefore in particular shows those tongues 3, which are provided with noses 6. In this cut, it becomes apparent that the middle part 1 comprises a substantially cylindrical, axially extending portion 9, which ends in the support surface or the supporting ring 8 respectively. The section 9 allows to keep a distance of the CD 2 from the plane of the middle part 1 in the region of the CD (not displayed) where effectively data are stored. FIG. 1a) shows, how the tongues 3 are L-shaped and that they are provided with a groove 7, into which the inner diameter of the central opening of the CD 2 is to fit. This groove 7 results from the noses 6, at the position of which the tongues are slightly widened towards a radial outwards side.

From FIG. 1a) it can among other things be seen, how the crown of tongues, which is fixed onto a ring (within the radial inner boundary 12) with large thickness of the material, forms a quasi stiff unit, which by means of the flexible part 11 is connected to the outer part of the middle part 1. If a cassette 18 comprising such a fastening device is dropped in the direction of the axis of the fastening device, the unit defined by the CD 2 and the crown of tongues 3,3' is allowed to yield elastically, and the power of the fall or the moment exerted by the CD, respectively, can thus not act onto the elasticity of the tongues, and correspondingly the CD cannot fall out of the crown.

FIG. 1 in particular also shows the connecting element 14, which is provided with a central knob 16 provided on the axis of symmetry of the fastening device, as well as with strips 15, leading to each of the tongues 3,3' and which are provided as flat lamella. The knob may be designed as a solid piece, but it may also be given in the form of a ring, that is with a central opening. The strips 15 typically have a width of 1.6 mm and a thickness of 0.22 mm, and the knob has a diameter of 5 mm. FIG. 1a) shows the connecting element 14 in its first position (solid line) as well as in its second position 14' (dotted line, thin). The strips 15 are provides with a horizontal portion 17 which is directly connected to the tongues, 3,3', and with a bent part, which is adjacent to the horizontal part, and which connects the strips with the knob 16.

In the first position of the connecting element 14, which corresponds to the manufacturing position, the connection element extends above the tongues towards the upper side. The upper surface of the knob 16 in this particular example extends by 3 mm above the upper edge of the tongues. In this position, the tongues 3,3' typically have too low a restoring force for fixing a data carrier 2 sufficiently.

Correspondingly, as indicated with reference numeral 14', the connecting element 14 is brought into its second position 14' after manufacturing, in a downwards motion, and subsequently the upper surface of the knob is located slightly below the upper surface of the tongues 3,3'. By means of this folding down (or snapping motion, because in the second position, the connecting element is again in a stable state, i.e. the element does not without external force shift back into its first position) by means of the strips 15 (pre-)tension of the tongues is provided, leading to an increased restoring force of the tongues if they are forced in an inner direction, i.e. towards the axis of symmetry of the fastening device. Therefore, the data carrier is fixed more efficiently in the fastening device. However, the shifting from the first to the second position is not a closing of the fastening device, which subsequently leads to a situation, that the data carrier cannot be removed from the cassette 18 if the connecting element 14' is in its second position. Quite on the contrary, the fastening device is designed such that the knob 16 always remains in its second position, and that the removal as well as insertion is possible in this position. The shifting from the first to the second position is only there to increase the restoring force which cannot be achieved due to the materials used in the manufacturing and/or due to their thickness, by means of the mentioned pretension.

The knob additionally has the advantage, that for removal of the data carrier this knob can simply be pressed down, correspondingly then the tongues tilt towards the inner side and the CD can easily be removed from the cassette 18. Very often, if one presses down corresponding fastening devices without connecting element, fingers get stuck between the tongues if the tongues are tilting toward the inner side.

For better illustration of the two positions in FIG. 2a) the first position of the connection element 14 is showed leaving out most of the reference numerals, and in FIG. 2b) the second position of the connecting element 14' is shown with an inserted data carrier 2.

In an embodiment according to FIG. 1 and according to FIGS. 2a) and 2b) all tongues 3,3' are connected to the central knob 16 by means of strips 15. It is however also possible to connect only those tongues 3 via strips 15 with the knob 16, which are provided with a nose 6. Since in particular the tongues 3 with noses 6 are important with respect of the restoring force and the fixing of the CD, it is typically sufficient to provide only the 4 strips 15 as indicated in FIG. 2c). The provision of 8 strips 15 as indicated in FIGS. 1 and 2a) and 2b) can be particularly advantages if such fastening device is to be designed for several CDs, or if the 4 strips 15 as indicated in FIG. 2c) have the tendency to break easily.

What is claimed is:

1. A fastening device for at least one disc shaped data carrier in a cassette, said disc shaped data carrier comprising a central opening, wherein the cassette comprises a middle part on which a crown of tongues with noses for fastening the data carriers is provided, the crown of tongues is elastically insertable into the central opening of the at least one data carrier, wherein there is provided at least one connecting element movably connecting at least two of the tongues with noses, wherein the connecting element is movable from an as produced first position to a second position, the second position providing an increase in the restoring force of the tongues against the data carrier as compared to the restoring force provided in the first position, wherein each of the tongues comprises an axial arm extending through the central opening of the at least one data carrier and wherein the at least one connecting element is attached to the axial arms.

2. The fastening device according to claim 1, wherein the data carrier can be fastened and removed from the cassette if the connecting element is in its second position.

3. The fastening device according to claim 1, wherein opposed tongues are connected with each other by means of the at least one connecting element.

4. The fastening device according to claim 1, wherein in the first position the connecting element at least partially extends above the ends of the axial arms pointing towards the direction of removal of the data carrier and/or of the radial arms respectively, wherein by means of pressing the connecting element down in the direction of insertion of the data carrier, the connecting element is brought into the second position.

5. The fastening device according to claim 4, wherein the connecting element is brought into the second position by a snapping process.

6. The fastening device according to claim 4, wherein the connecting element in the second position does not extend above the ends of the axial arms pointing towards the direction of removal of the data carrier and/or of the radial arms respectively.

7. The fastening device according to claim 1, wherein the connecting element comprises elastic strips, the elastic strips on one end are connected with the axial arms or radial arms of the tongues, respectively, and wherein the connecting element furthermore comprises a knob which is substantially located on an axis of symmetry of the fastening device, the strips are connected with their second end to the knob.

8. The fastening device according to claim 1, wherein the tongues and the at least one connecting element are one-piece.

9. The fastening device according to claim 1, wherein the fastening device is made of a polymeric material with a modulus of elasticity E in the range of approximately 1300 to 3200 MPa, and wherein the polymeric material is a thermoplastic material in one-component design or two-component design.

10. The fastening device according to claim 9, wherein the modulus of elasticity E is less than approximately 2000 MPa.

11. The fastening device according to claim 1, wherein the crown comprises 6 or 8 or 10 tongues, wherein tongues with noses for fastening the data carrier alternate with tongues without noses, and wherein either all tongues or only the tongues with noses are connected by means of the connecting element, wherein the connecting element comprises a central uniform part, as well as elastic strips branching off from the central, uniform part by at least indirectly connecting this central, uniform part with the tongues.

12. The fastening device according to claim 1, wherein a middle part comprises an inner, substantially disc shaped part, on an inner edge of which the tongues are attached spaced from each other leaving slots between the tongues, and wherein the inner part comprises means allowing an increased elastic mobility of the crown of tongues with respect to the cassette, wherein these means are in the form of a circumferential region with reduced thickness, and/or in the form of a circumferential rippled region, and/or in the form of holes in the inner part.

13. The fastening device according to claim 1, wherein the disc shaped data carrier is a CD or a DVD.

14. The fastening device according to claim 1, wherein the at least one connecting element comprises strips in the form of flexible, flat lamella with a width in the range of approximately 0.8 to 3 mm, and with a thickness of 0.1 to 0.4 mm.

15. The fastening device according to claim 14, wherein the width is in the range of approximately 1 to 2 mm and the thickness is in the range of approximately 0.2 to 0.3 mm.

16. A method for the production of a fastening device according to claim 1, comprising the steps of forming the connecting element in a production process in the first position, and subsequently, at the latest after insertion of the at least one data carrier, moving the connecting element into the second position for increasing the restoring force of the tongues against the data carrier.

17. The fastening device according to claim 1, wherein the axial arms are connected indirectly by means of inwardly pointing radial arms provided on the ends of the axial arms pointing towards the direction of removal of the data carrier.

* * * * *